Patented Apr. 26, 1938

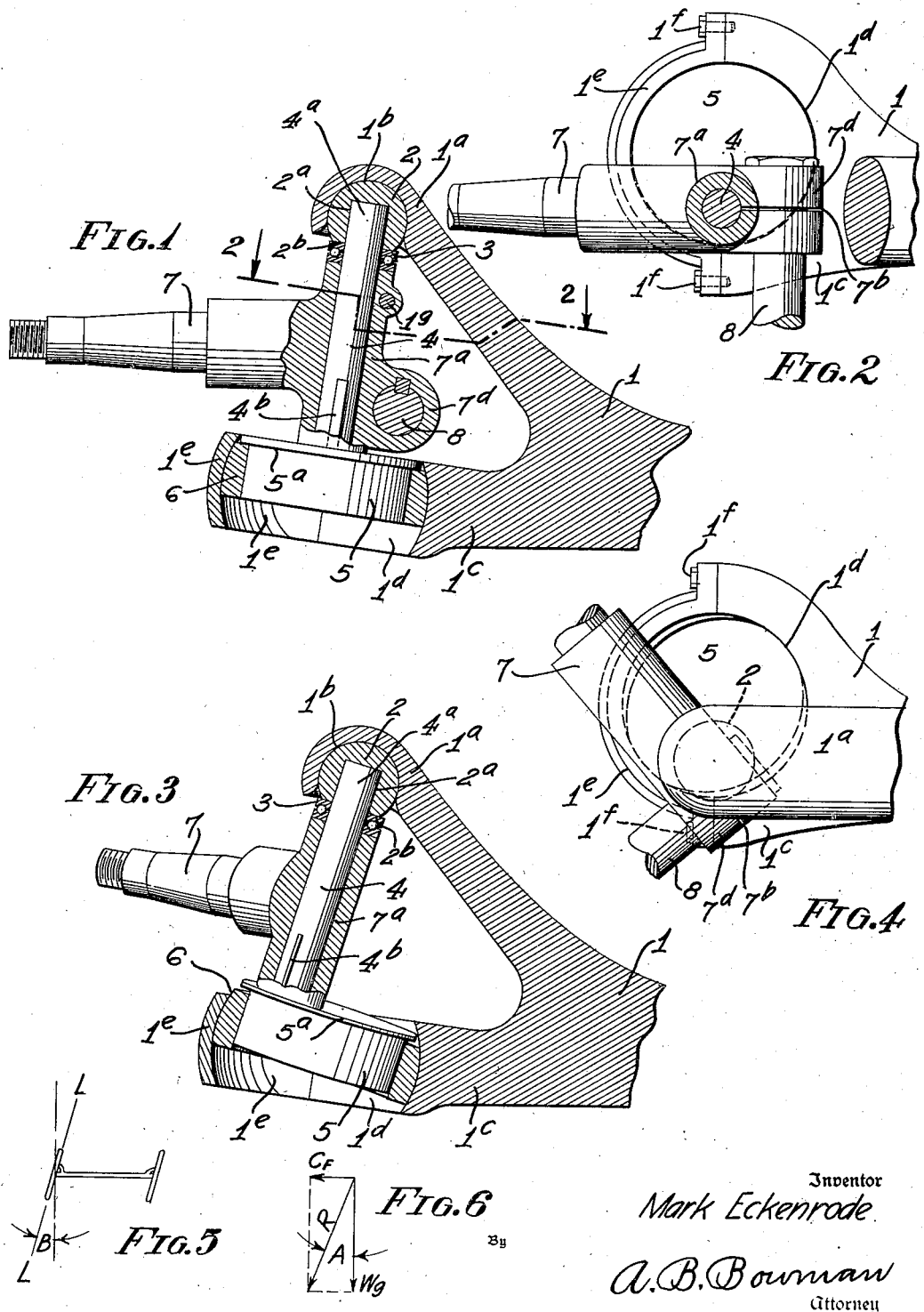

2,115,256

UNITED STATES PATENT OFFICE 2,115,256

VEHICLE FRONT WHEEL BANKING APPARATUS

Mark Eckenrode, San Diego, Calif., assignor of one-half to George C. Compton, San Diego, Calif.

Application April 3, 1936, Serial No. 72,609

7 Claims. (Cl. 280—96.1)

My invention relates to an apparatus for banking the front wheels of a vehicle when turning a corner with the vehicle to affect the direction of the stresses and prevent the collapse of the front wheel, particularly when making short, rapid turns, and the objects of my invention are:

First, to provide a front wheel axle and wheel support for vehicles which automatically banks the wheel with the turning of the vehicle;

Second, to provide a front vehicle banking apparatus in which the support between the wheel steering knuckle and axle is shifted from a substantially vertical to an inclined position upon the operation of the steering knuckle arm in connection with the steering knuckle so as to bank the wheel when turning;

Third, to provide an axle and wheel steering knuckle connection for the front wheels of vehicles in which the wheel is banked in direct proportion to the amount of the turn of the wheel in going around a corner;

Fourth, to provide an apparatus of this class in which the front wheels on opposite sides of the vehicle are angled in the right proportions and in the right direction for affecting the direction of the stresses and preventing the collapse of the wheels when making short rapid turns;

Fifth, to provide an apparatus of this class in which the front axle and wheel steering knuckle may be substantially conventional with but slight changes in their construction and cooperative relation;

Sixth, to provide an apparatus of this class which is very simple and economical of construction, durable, efficient in its action, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Fig. 1 is a partial sectional and partial rear elevational view of the axle, steering knuckle and connecting parts, the axle being shown fragmentarily and showing the steering knuckle in a position when the wheel is substantially vertical; Fig. 2 is a sectional view from the line 2—2 of Fig. 1; Fig. 3 is a view similar to Fig. 1 but showing the steering knuckle shifted with the wheel in banked position; Fig. 4 is a fragmentary top or plan view showing the steering knuckle in position with the wheel in banked position; Fig. 5 is a diagrammatic view showing the wheels in an assumed proper banked position, the angle B being the assumed proper angle; and Fig. 6 is a diagrammatic view showing the forces operative on a vehicle for indicating the proper banking angle, the line of force indicating the arrow at the top by centrifugal force while at right angles thereto is weight and gravity force while the line R is the assumed proper angle for the banking of the wheel 7.

Similar characters of reference refer to similar parts and portions throughout the several views of the drawing:

The main front axle 1, ball member 2, thrust bearing 3, king pin 4, eccentric member 5, bearing member 6, steering knuckle 7, and steering knuckle arm 8 constitute the principal parts and portions of my vehicle front wheel banking apparatus.

The front axle 1 is bifurcated at its end and provided at the upper bifurcated portion 1a with a hollow spherical socket portion 1b and at its lower branch 1c it is provided with a partial spherical socket portion 1d which is substantially semi-spherical and secured thereto is a conforming cap member 1e secured thereto by means of bolts 1f as shown best in Figs. 2 and 4 of the drawing. Mounted in the socket portion 1b is a ball member 2 which is provided with a bore 2a extending inwardly from one side in which is mounted the normally upper end 4a of the king pin 4, it being noted that the ball member is provided with a flat side 2b, against which rests a thrust bearing 3, which is preferably a ball bearing. This king pin 4 extends downwardly and is integrally secured eccentrically with an eccentric member 5 which is cylindrical in form and provided with a flange 5a at its upper side. This eccentric member 5, together with the flange 5a, is positioned in the spherical portion 1d and the spherical portion formed by the conforming cap 1e and supported therein by means of a partially spherical bearing member 6 which fits the periphery of the eccentric member 5 at its inner side and fits the partially spherical portion 1d and conforming portion formed by the cap 1e so that the eccentric member 5 may revolve together with the king pin 4 in this partially spherical portion on a substantially vertical axis and may shift in the portion 1d for changing the substantially vertical angle of the king pin 4 with the revolution of the eccentric member 5 on its substantially vertical axis.

Secured on the king pin 4 and prevented from torque movement by key 4b is the hub portion 7a of the steering knuckle 7 with its upper end resting against the thrust bearing 3 and the lower end against the eccentric member 5. This steering knuckle is also clamped at its upper side by means of a bolt 1g to provide a tight fit on the king pin 4, the steering knuckle being slit at 7b to permit the clamping of said member rigidly on the king pin 4.

The steering knuckle 7 is provided with an extended lug portion 7d in which is secured the one end of the steering knuckle arm 8, which provides means for shifting and turning the eccentric member 5 in the lower side of the axle, therefore, shifting the king pin to various vertical inclinations for banking the wheel on the steering knuckle 7, it being noted that the eccentric 5 is raised and lowered slightly in the bearing 6 as shown by the varying positions in Figs. 1 and 3 of the drawing with the turning of the steering knuckle 7 together with the eccentric 5.

The operation of my vehicle front wheel banking apparatus is as follows: Upon the usual or conventional movement of the steering knuckle arm 8, the steering knuckle 7 will be shifted with its outer end forwardly at one side of the vehicle and its outer end backwardly at the opposite side of the vehicle which turns the king pin 4 and eccentric 5 in the bearing and inasmuch as this king pin 4 is eccentrically connected with the eccentric 5, will cause the steering knuckle 7 to assume varying angles from the horizontal at opposite sides of the vehicle, thus banking the wheels as shown by diagrammatic view in Fig. 5 of the drawing and affecting the direction of the stresses as shown in Fig. 6 of the drawing.

Though I have shown and described a particular construction, combination and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In a vehicle front wheel banking apparatus, a front wheel main bifurcated axle provided with a ball socket in the upper member, a partially spherical socket in the lower member, a bearing in said upper socket, and a spherical bearing in the lower socket, and a steering knuckle with the vertical axis of the king pin eccentrically positioned in the bearing in the lower member.

2. In a vehicle front wheel banking apparatus, a front wheel main bifurcated axle provided with a ball socket in the upper member, a partially spherical socket in the lower member, a bearing in said upper socket, a spherical bearing in the lower socket, a steering knuckle with the vertical axis of the king pin eccentrically positioned in the bearing in the lower member, and means for shifting said steering knuckle around its axis.

3. In a vehicle front wheel banking apparatus, a front wheel main bifurcated axle provided with a ball socket in the upper member, a partially spherical socket in the lower member, a bearing in said upper socket, a spherical bearing in the lower socket, a steering knuckle with the vertical axis of the king pin eccentrically positioned in the bearing in the lower member, and means for shifting said steering knuckle around its axis whereby the normally vertical axis of said steering knuckle is shifted to various inclinations because of the eccentric mounting of its axis.

4. In a vehicle front wheel banking apparatus, a vehicle front wheel axle with a bifurcated end with one bifurcated member positioned above the other, a steering knuckle with a substantially vertical and horizontal axis, its vertical axis pivotally mounted in the upper bifurcated member of said axle and its lower end eccentrically and shiftably mounted in the lower bifurcated member of said axle, and a bearing member in connection with said eccentric mounting to allow horizontal shifting of the steering knuckle relative to the lower member of said axle.

5. In a vehicle front wheel banking apparatus, a vehicle front wheel axle with a bifurcated end with one bifurcated member positioned above the other, a steering knuckle with a substantially vertical and horizontal axis, its vertical axis pivotally mounted in the upper bifurcated member of said axle and its lower end eccentrically and shiftably mounted in the lower bifurcated member of said axle, a bearing member in connection with said eccentric mounting to allow horizontal shifting of the steering knuckle relative to the lower member of said axle, and a steering knuckle arm in connection with said steering knuckle for turning said steering knuckle on its vertical axis, thereby shifting the angle of its substantially horizontal axis.

6. In a vehicle front wheel banking apparatus, the combination with a front wheel axle, of a steering knuckle provided with a universal bearing in which the upper portion of its king pin is centrally and pivotally mounted, and an eccentric and readily shiftable bearing for said king pin at its lower end.

7. In a vehicle front wheel banking apparatus, the combination with a front wheel axle, of a steering knuckle provided with a universal bearing in which the upper portion of its king pin is centrally and pivotally mounted, and an eccentric and readily shiftable bearing for said king pin at its lower end, and means for shifting said steering knuckle on its normally vertical axis whereby the lower end of its normally vertical axis is shifted in inclination from the vertical, therefore shifting the horizontal axis of said steering knuckle.

MARK ECKENRODE.